Dec. 31, 1963    W. BEYER ETAL    3,115,806
METHOD OF CONDENSED MOTION PICTURE FILMS FOR PROJECTION
Filed July 20, 1959
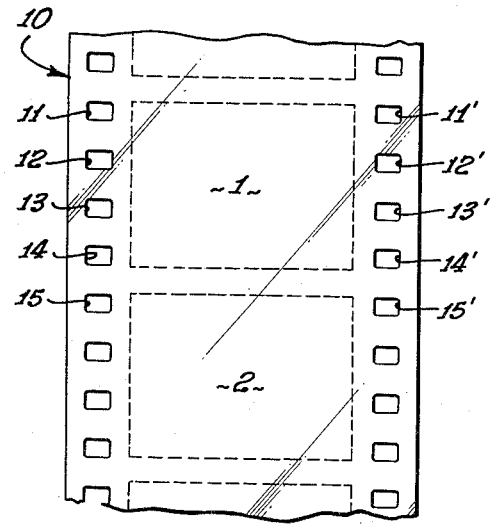
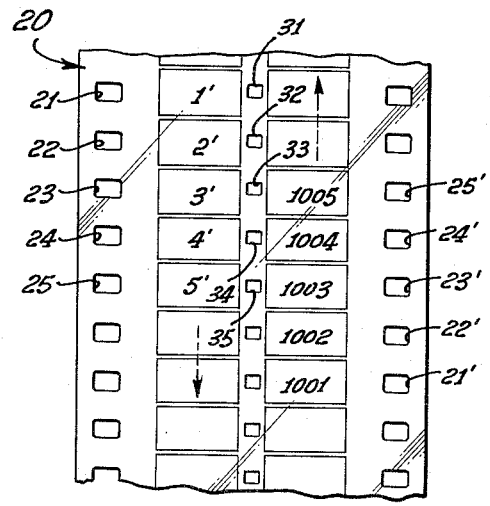
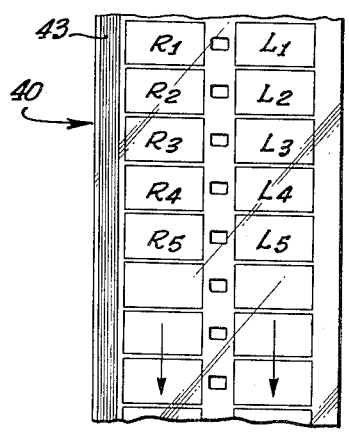
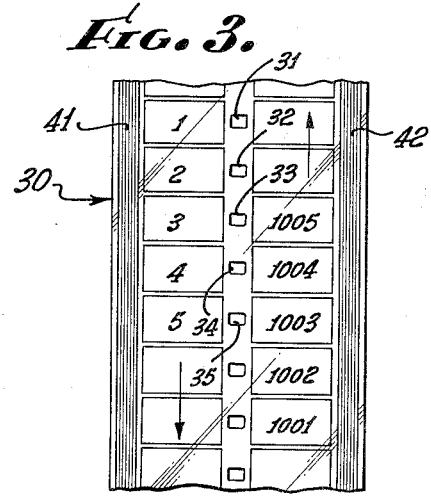
WALTER BEYER
WILLIAM F. KELLEY
INVENTORS.
BY Miketta and Glenny
ATTORNEYS.

United States Patent Office 3,115,806
Patented Dec. 31, 1963

3,115,806
METHOD OF CONDENSED MOTION PICTURE FILMS FOR PROJECTION
Walter Beyer, Los Angeles, and William F. Kelley, Sun Valley, Calif., assignors, by mesne assignments, to Cordova, Inc., Beverly Hills, Calif., a corporation of California
Filed July 20, 1959, Ser. No. 828,401
5 Claims. (Cl. 88—24)

This invention relates to methods of economically producing motion picture films of either mono-ocular or stereoscopic type for projection and exhibition in theaters, homes or educational institutions, the release film having a physical length (for a given projection time at standard 24 frames per second) of only one-fourth or one-third the normal length of a standard 35 millimeter film. The methods are particularly directed to arrangements which permit photographing, processing and projection on standard, commercially available equipment (with modifications in some instances which do not require departure from the use of standard sprockets, perforations, registrations, pins or pull-down mechanisms) and permit the utilization of commercially available film.

A need exists for a method of making available and exhibiting full length feature films in homes and educational institutions without the use of bulky equipment, threading or other handling or preparation of the film on the part of the home user or teacher or instructor. A standard 35 mm. motion picture film is not adapted for home release films because of its length; approximately eight magazines of a convenient size would be required to house a 35 mm. film carrying a full length feature picture. Not only would the projector be large but the home user would have to become a skilled operator in changing reels, properly threading the projector, etc. When a feature length motion picture film is processed and handled in accordance with the present invention, the entire film may be housed in a single reel or cartridge capable of being readily transported and used by the home projectionist without the necessity of threading or handling of the film in any manner.

Although images from standard 35 mm. film have been printed in reduced form upon 16 mm. film and in various arrangements on 35 mm. film in the past, the methods employed were not capable of being carried out on commercially available standardized equipment and did not attain the compactness and accuracy of registration or the economy which characterizes the methods of the present invention. Sound tracks were not properly accommodated. Prior systems which departed from the standardized size and pitch of sprocket holes used in standard film required the replacement of literally millions of dollars worth of processing and projecting equipment and thereby failed to be adapted to commercial exploitation.

The present method employs commercially available continuous film provided with standard perforations; the film may be readily processed in a continuous manner in commercially available equipment; it is adapted for projection in equipment which in some cases can be readily modified without change from normal and customary sprockets, the size and pitch of their teeth or of standard registration pins and pull-down mechanisms. By the use of specially designed projection lens systems (readily adapted to existing projectors), stereoscopic pictures may be projected and exhibited. By the use of sealed magazines and projectors specially designed for home and institutional use (such magazines and projectors forming the subject matter of a separate application), full length feature motion pictures may be exhibited by persons having no experience in the handling of film and without the necessity of having the film touched by such tyro.

It is an object of the present invention, therefore, to disclose and provide methods of processing and producing compact continuous motion picture film carrying images which are accurately registered to standard size perforations of such film, the continuous release print being provided with a sound track and having a physical length which is only a fraction of the original from which such release print was made.

A further object of the invention is to disclose and provide conditions and methods which permit the manufacture of continuous motion picture films in an economical manner from commercially available film and by the use of commercially available equipment, such film bearing thereon longitudinally disposed series of pictorial images for sequential projection. One of the forms of continuous release film produced in accordance with the methods of the present invention carries two longitudinally disposed series of images, laterally adjacent images being adapted for simultaneous projection to permit exhibition of stereoscopic images.

Other objects and advantages of the present invention and the materials, steps and conditions of the method will become apparent from the following description. In order to facilitate understanding, reference will be had to the appended drawings in which:

FIG. 1 is a representation of a section of standard 35 mm. film bearing a series of consecutive picture areas and images.

FIG. 2 illustrates a standard 35 mm. film bearing thereon two longitudinally disposed series of reduced images and their corresponding sound tracks, such film resulting from the performance of the method of this invention.

FIG. 3 represents the final release film resulting from the method of the present invention.

FIG. 4 illustrates a modified form of final film produced in accordance with the methods herein disclosed, this type of film being particularly adapted for the exhibition of stereoscopic pictures.

Attention is specifically drawn to the fact that the continuous motion picture films employed in the performance of the present method are standard, readily available, continuous films, provided with normal standard perforations. Such film can therefore be handled and processed by normal methods on commercially available equipment and does not require specialized equipment. The film employed may be of the monochromatic type or bear images in substantially natural color.

The standard 35 mm. film 10 illustrated in FIG. 1 may represent a negative taken of the action to be reproduced in the finished release film. It will be noted that this standard 35 mm. film is provided with the usual marginal perforations 11–15 and 11'–15'. Each of the picture or image areas, such as 1 and 2, may be of the usual or normal size as established by the camera gate, say 0.868 by 0.631 inch. A longitudinally extending sound track may or may not be carried by this negative film; in most instances the sound track has been separately recorded on a separate strip of film or tape in synchronization with the action depicted on film 10. This negative film 10 is developed and processed in the normal manner on standard equipment.

In accordance with the method of this invention, the images carried by one or more negative films of the type illustrated in film 10 are now printed upon a second standard 35 mm. film illustrated at 20 and also provided with the standard perforations 21–25 and 21'–25'. Printing by optical reduction from one 35 mm. film to another is readily accomplished in commercially available equipment. During such optical reduction printing, size of the image areas 1, 2 and the like is reduced in the ratio of about 2.66–1, the film 20 advancing at ¼ the speed of the negative film 10. The series of images so optically printed upon the film 20 is illustrated by the series 1′, 2′, 3′, 4′ and 5′ in FIG. 2 and it will be noted that such reduced images are optically printed to one side of a medially disposed area 26. Such series of images are adapted to be printed with their bases transverse to the longitudinal axis of the film and with their transverse centers spaced about 0.187 inch. Such medially disposed area carries a series of perforations 31–35, these perforations being on the same centers or having the same pitch as the perforations 21–25. However, these medially arranged perforations 31–35 are of the size used in standard 16 mm. film (0.072 by 0.050 inch). This axial row of perforations is therefore adapted to be used with standard 16 mm. registration pins; however, during printing upon the film 20, these perforations are not employed and all registration is accomplished by the standard 35 mm. perforations 21–25 which are usually 0.110 by 0.078 inch.

When the release film is to be used on a long or feature length presentation, each of the picture areas 1′–5′ may be about 0.310 by 0.175 or 0.177 inch so as to present a desirable aspect ratio of 1.75 to 1. After one-half of the total negative film has been printed in the form of reduced images in one sequential longitudinally extending row on one side of the median area 26 (as illustrated by the series 1′–5′), the remaining series of negative images is printed upon the film 20 in a reverse direction on the other side of the median area as represented by areas 1001–1005 in FIG. 2.

By employing the reduction ratio hereinbefore stated, an adequate space exists to each side of each of the series of images for the accommodation of a correlated, synchronized sound track, without interference with the rows of perforations adjacent the edge of the film.

In actual practice, the optical reduction and printing described hereinbefore may be done in black and white on a dupe negative or color in the form of a matrix or color duplicating film for subsequent printing. The final release film may then be contact printed from the dupe negative 20 upon a suitable 35 mm. film to which the sound tracks 41–42 are applied. This contact printed release print is then longitudinally trimmed so as to remove the longitudinal edge portions carrying the 35 mm. perforations; the resultant release film is illustrated in FIG. 3 at 30. The sound tracks 41 and 42 are displaced with respect to the correlated picture areas in accordance with the characteristics of the projector in which the film is to be shown.

It is to be noted that until the final step of cutting and removing the outer edge portions is performed, each of the films is a standard 35 mm. film capable of being handled in normal equipment. The release print 30 can now be driven and registered by the axially disposed row of perforations 31–35, one of said perforations being correlated (and preferably centered) with respect to each of two laterally disposed image areas. As previously stated, each of the perforations 31–35 is a standard 16 mm. perforation.

By the utilization of a suitable type of release printing stock, the total thickness of the release print, including emulsion and sound, need not exceed 0.0047 inch. A total length of 1250 feet of such film may be carried upon a reel having a hub two inches in diameter, the reel being 9.5 inches outer diameter. The two longitudinally disposed rows of images are the equivalent of a ten thousand foot full length feature film.

It is to be understood that the series of images 1′–5′ may concern the same subject matter, plot or story as that depicted in the series indicated at 1001–1005, or each series may concern a different subject or story. In other words, the finished film may either be a full length, coherent presentation of a single subject or story or it may comprise two or more related subjects or even unrelated subjects.

During projection of a film, such as is illustrated at 30, the projector is arranged so as to project and exhibit the images carried by the series 1–5 and concurrently reproduce sound from the correlated track 41 while the film is being driven in one direction by means of the perforations 31–35. Upon reaching the end of such longitudinally aligned series of images, the entire magazine containing the film may be reversed and the second, adjacent series of images 1001–1005 can then be projected with its correlated sound track 42, the film now moving in the opposite direction. It will be noted that the images carried by each of the image areas and their bases are transverse to the longitudinal axis of the film, one series of images being in inverted position with respect to the other series.

FIG. 4 illustrates a modified form of film which can be obtained from standard 35 mm. film in very much the same manner as that described heretofore. The film 40 illustrated in FIG. 4 is also provided with a medial area provided with spaced perforations of the 16 mm. type but the two series of images carried by such film are obtained from simultaneously exposed negatives from laterally spaced points of view. In other words, the series R1–R5 represents images observed by the right eye or right lens of a camera, whereas the series L1–L5 constitutes the complementary left eye images. R1 and L1 therefore constitute stereoscopic pairs. The images of both series are again in lateral alignment and with their bases transverse to the axis of the film 40 but one series is not reversed or inverted with respect to the other. Only a single correlated sound track, such as 43, need be carried by the film. FIG. 4 represents the film after the edge areas carrying the 35 mm. sprocket holes have been removed.

The film illustrated in FIG. 4 is therefore adapted for the projection of stereoscopic pairs so as to present a continuous motion picture in three dimensions. A split lens or twin lens projector is required, suitable polarizing filters being used in the projector and worn by the observers of the projected images.

A continuous film similar to that shown in FIG. 4 (in that correlated pairs of images in transverse alignment are carried thereon) may be obtained by taking original pictures of two separate objects, instrumentalities, action, etc., by two separate but synchronized or interlocked cameras and then printing the two separate (but correlated) series of images in correlated, transversely aligned relation. The original films can be exposed at any desired speed and the finished projection film can then be run at a speed suitable for study of the information carried thereon; the two correlated pictures may be projected upon adjacent areas of a screen or in superimposition. For example, one series may depict the firing or flight of a missile and another carry images of instrumentation or related information, thereby permitting careful and accurate study and observation.

We claim:

1. In a method of making a full length feature motion picture film which can be processed on standard 35 mm. motion picture film equipment wherein the finished feature film is substantially shorter in length and narrower in width than the standard 35 mm. motion picture film containing a comparable full length feature picture, the steps of:

printing standard size visible images from a standard 35 mm. film strip onto a standard 35 mm. motion picture negative film having standard 35 mm. type sprocket holes along each longitudinal edge area and optically reducing said images to ¼ the original height to form a series of negative images in adjacent relation on one side of the center line of said negative films, inverting the negative and optically printing and reducing a further series of visible images from said standard 35 mm. film onto the negative to form a continuing series of reduced images in adjacent relation on the other side of the centerline of said negative film, said continuing series extending in a direction opposed to the series on the first side of said centerline and being spaced therefrom, processing the motion picture negative through standard 35 mm. film processing equipment to provide an original negative having visible images thereon, printing the original negative on a standard 35 mm. film using standard 35 mm. film equipment to provide a latent positive feature film, processing said film through standard 35 mm. film equipment to provide the feature film, forming a row of center perforations on the feature film with one perforation for each image, providing a magnetic sound record track for each of said reduced series of images between normal edge perforations of said 35 mm. film and each series of reduced images, and cutting and removing the longitudinal edge areas on both sides of the feature film to remove normal edge perforations of the 35 mm. film and provide a film containing a full length feature picture of substantially less size than the normal 35 mm. film.

2. A method of converting standard 35 mm. continuous motion picture film into a compact continuous moture projection film comprising:

optically reducing and printing successive image areas arranged in longitudinal series upon 35 mm. film having standard 35 mm. type sprocket holes along each longitudinal edge area, such series of images being printed with their bases transverse to the longitudinal axis of the film and with their transverse centers spaced about 0.187 inch, such series of images being printed to one side of a medial area not over about 0.1 inch wide, similarly optically reducing and printing a second succession of images in successive image areas in longitudinal series on the other lateral side of said medial area, continuously developing such printed film by moving said film by said standard 35 mm. sprocket holes, providing a series of standard 16 mm. type sprocket perforations along said medial area with such perforations on centers spaced about 0.187 inch, and then removing longitudinally extending edge area portions on both sides of said film carrying said sprocket holes.

3. A method as stated in claim 2 wherein the second succession of images is printed in inverted position with respect to the first series.

4. A method as stated in claim 2 wherein the second succession of images comprises a series of stereoscopic complements of the first series and is printed with stereoscopically complementary images in transverse alignment.

5. A method as stated in claim 2 including the step of applying a reproducible longitudinally extending sound track between a succession of images and the edge area of the film prior to the removal of such edge area.

References Cited in the file of this patent

UNITED STATES PATENTS

| | | |
|---|---|---|
| 1,267,411 | Howell | May 28, 1918 |
| 2,101,121 | Wixon | Dec. 7, 1937 |
| 2,265,960 | Woolf | Dec. 9, 1941 |
| 2,281,075 | McCormick et al. | Apr. 28, 1942 |
| 2,299,738 | Collins | Oct. 27, 1942 |
| 2,903,942 | Baumbrach et al. | Sept. 15, 1959 |

FOREIGN PATENTS

| | | |
|---|---|---|
| 289,998 | Great Britain | May 10, 1928 |
| 507,224 | Italy | Dec. 29, 1954 |
| 1,131,311 | France | Oct. 15, 1956 |